United States Patent [19]

Meinzer

[11] 4,229,712
[45] Oct. 21, 1980

[54] MATRIX NOZZLE FOR MIXING LASERS
[75] Inventor: Richard A. Meinzer, Rocky Hill, Conn.
[73] Assignee: The United States of America as represented by the Secretary of the Army, Washington, D.C.
[21] Appl. No.: 961,334
[22] Filed: Nov. 16, 1978
[51] Int. Cl.³ .............................................. H01S 3/02
[52] U.S. Cl. ........................ 331/94.5 D; 331/94.5 G
[58] Field of Search ................. 331/94.5 G, 94.5 D
[56] References Cited
U.S. PATENT DOCUMENTS
3,560,876  2/1971  Airey ............................ 331/94.5 G Primary Examiner—James W. Davie
Attorney, Agent, or Firm—Nathan Edelberg; Robert P. Gibson; James T. Deaton

[57] ABSTRACT

The matrix nozzle for mixing lasers in which an inner tube forms a path for the primary flow and a chamber around the inner tube opens around the outer periphery of the inner tube to form a flow path for the secondary gas flow. The exiting of the primary and secondary gases rapidly mix and cause lasing to take place. With this arrangement, the primary gas flow adds turbulence to the secondary gas flow as it exits and causes better mixing of the gases.

5 Claims, 3 Drawing Figures

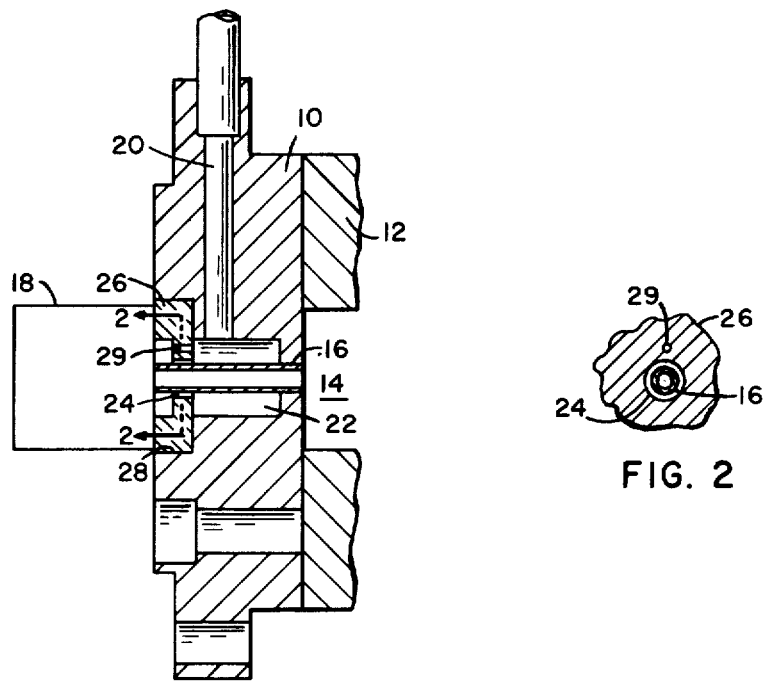
FIG. 1
FIG. 2
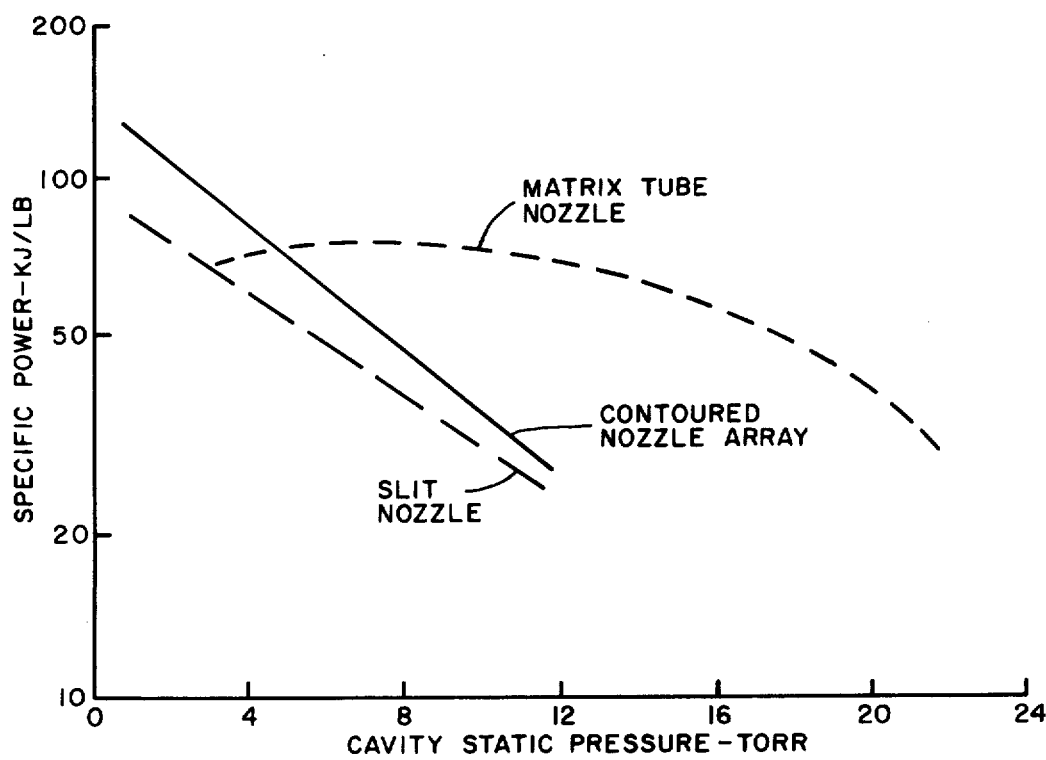
FIG. 3

MATRIX NOZZLE FOR MIXING LASERS

DEDICATORY CLAUSE

The invention described herein was made in the course of or under a contract or subcontract thereunder with the Government and may be manufactured, used, and licensed by or for the Government for Governmental purposes without the payment to me of any royalties.

BACKGROUND OF THE INVENTION

Several nozzle designs have been used fairly extensively with the HF laser. Two examples include the slit nozzle and the contoured-nozzle array. The principle shortcomings of these nozzles is the relatively small amount of optical power which can be extracted at high static pressures. Therefore, there is a need for a nozzle in which larger amounts of optical power can be extracted at high static pressures.

Accordingly, it is an object of this invention to provide a matrix nozzle in which larger amounts of optical power can be extracted at high static pressures.

Another object of this invention is to provide a matrix nozzle which has a larger specific power at higher static pressures than that of other previous nozzles.

Still another object of this invention is to provide a matrix nozzle in which the primary and secondary flows have a common axis with the secondary flow being around the primary flow.

Still another object of this invention is to use tubes in conveying the primary flow so that the primary flow can be used to heat the secondary gas and improve performance by causing a faster reaction rate at the nozzle exit plane.

A still further object of this invention is to provide tubes for the primary flow that can be extended to carry the primary flow beyond the exit plane at which the secondary flow is injected.

Other objects and advantages of this invention will be obvious to those skilled in this art.

SUMMARY OF THE INVENTION

In accordance with this invention a matrix nozzle is provided that has a housing with a tube interconnecting a plenum chamber for providing a primary gas flow to an optical cavity with a chamber around the primary tube and a symmetrical nozzle from the secondary chamber and around the primary tube for injecting a secondary gas into the optical cavity to cause the primary and secondary gases to mix and cause lasing to occur. The matrix nozzle can have a multiplicity of the primary and secondary gas openings for communicating the gases into the optical cavity.

BRIEF DESCRIPTION OF THE DRAWING

FIG. 1 is a schematic sectional view through a matrix nozzle in accordance with this invention, FIG. 2 is a sectional view along line 2—2 of FIG. 1, and FIG. 3 is a graph which compares the matrix nozzle with a slit type nozzle and a contoured type nozzle.

DESCRIPTION OF THE PREFERRED EMBODIMENT

Referring now to the drawing, a nozzle body 10 is shown connected to plenum chamber body 12 for defining plenum chamber 14 and a tube 16 interconnects plenum chamber 14 to an optical cavity 18 for supplying a primary gas stream flow from plenum chamber 14 to optical cavity 18. Body 10 has a passage 20 which connects to chamber 22 around tube 16 to define a passage and chamber for secondary gas flow, and a passage 24 around the circumference of tube 16 provides a nozzle for the secondary gas flow. Additional secondary passage 29 can also be utilized as an auxiliary nozzle. Passages 24 and 29 open into cavity 18 at an indented position from the end of tube 16 as illustrated. This is accomplished by plate 26 which is secured in cut out portion 28 of housing 10. Housing 10 can contain as many tubes 16 and surrounding nozzles 24 and auxiliary nozzles 29 as desired for providing primary and secondary gas flow passages to laser cavity 18. With the arrangement as illustrated, these nozzles allow for rapid mixing of a primary gas stream (supersonic or subsonic) with the secondary stream (supersonic or subsonic). The primary gas stream that flows through tube 16 usually has a gas temperature of 300 to 2,000 K. as a consequence of partial combustion or other heating processes which occur in plenum chamber 14. As a direct consequence of the expansion of the gases after they leave the tubes at the exit plane of the nozzle, a non-equilibrium condition is frozen into the primary gas stream. The secondary gas stream flowing through nozzle 24 or nozzles 24 and 29 mixes with the primary stream and an active medium results from the interaction of the primary and secondary gas streams. Optical cavity 18 then utilizes the active medium to generate a laser beam. The primary gas stream can be composed of such gases as F-atoms, O-atoms, Cl-atoms, Br-atoms, $N_2$, etc., and the secondary gas stream can contain such species as $H_2$, $D_2$, HI, $CO_2$, etc. As a consequence of mixing these gas streams at the nozzle exit plane shown in the drawing, HF, DF, HCl, DCl, HBr, $N_2$—$CO_2$, etc., lasers can be operated.

As can be seen, tube 16 is surrounded by the secondary gas in chamber 22 and therefore the heated primary gas from plenum chamber 14 can heat the secondary gas as it flows through tube 16. The heating of the secondary gas improves performance by causing a faster reaction rate at the nozzle exit plane. Also the use of small openings in the nozzle exit plane results in rapid mixing. As illustrated, the extension of the end of tube 16 beyond the exiting of nozzle 24 helps to reduce gas recirculation and also causes more rapid mixing by putting some pre-turbulence in the secondary gas stream. It is also pointed out that tube 16 can be lengthened or shortened and chamber 22 likewise lengthened or shortened depending upon the amount of heat desired to be transferred from the primary stream to the secondary gas.

In operation, the selected primary gas flows from plenum chamber 14 through primary gas tube 16 and secondary gas flows from passage 20 through chamber 22 and out nozzle 24 or nozzles 24 and 29 with the primary and secondary gases flowing into optical cavity 18 to cause lasing action to occur. With the arrangement of the primary and secondary gas flows, large amounts of optical power can be extracted at high static pressures within optical cavity 18, for example, static pressures up to 20 torr or more. As illustrated in FIG. 3, the prior slit nozzle and contoured nozzle arrays do not have this capability and the optical power thereof falls drastically as the static pressure is increased. Therefore, applicant's matrix nozzle arrangement is a considerable improvement over the slit nozzle and contoured nozzle arrays.

I claim:

1. A matrix nozzle for mixing lasers comprising a body having a plenum chamber therein, a housing connected to said body on one side, an optical cavity connected on the other side of said housing, a tube mounted in said housing and having a passage therein, said passage interconnecting said plenum chamber and said optical cavity for directly supplying a primary gas stream from said plenum chamber to said optical cavity, flow passage means in said housing and surrounding said tube, and an opening in said housing defining a passage surrounding said tube and connecting said flow passage means to said optical cavity, said opening having an axis that is symmetrical with the axis of said tube passage for supplying a secondary gas stream to the optical cavity.

2. A matrix nozzle for mixing lasers as set forth in claim 1, wherein said tube passage opens into the optical cavity at a plane that is spaced from the opening for the passage surrounding said tube, whereby gas recirculation is reduced and pre-turbulence is induced in the secondary gas stream.

3. A matrix nozzle as set forth in claim 1, wherein said flow passage means includes a chamber around a portion of said tube passage, whereby heat can be transferred from the primary gas stream to the secondary gas stream.

4. A matrix nozzle as set forth in claim 1, wherein said primary gas stream contains gases selected from the group containing F-atoms, O-atoms, Cl-atoms, Br-atoms, and $N_2$, and said secondary gas stream contains gases selected from the group consisting of $H_2$, $D_2$, HI, and $CO_2$.

5. A matrix nozzle as set forth in claim 1, wherein said housing has a secondary passage therein opening from said flow passage means into the optical cavity to provide an auxiliary nozzle for supplying an auxiliary secondary gas stream to the optical cavity of the secondary gas.

* * * * *